United States Patent [19]
Shiraiwa et al.

[11] 3,872,378
[45] Mar. 18, 1975

[54] APPARATUS FOR SUPPORTING AND PROPELLING MATERIAL THROUGH MAGNETIC FLAW DETECTION DEVICES

[75] Inventors: Toshio Shiraiwa, Nara; Tatsuo Hiroshima, Minoo, both of Japan

[73] Assignee: Sumintomo Metal Industries, Limited, Osaka, Japan

[22] Filed: Nov. 12, 1973

[21] Appl. No.: 414,943

Related U.S. Application Data

[60] Continuation of Ser. No. 185,688, Oct. 1, 1971, abandoned, which is a division of Ser. No. 21,062, March 19, 1970, Pat. No. 3,670,239.

[52] U.S. Cl. .................................................. 324/37
[51] Int. Cl. ........................................... G01r 33/12
[58] Field of Search ................................ 324/37, 40

[56] References Cited
UNITED STATES PATENTS

| | | | |
|---|---|---|---|
| 3,447,074 | 5/1969 | Sower et al. | 324/37 |
| 3,579,099 | 5/1971 | Kanbayashi | 324/37 |
| 3,612,987 | 10/1971 | Placke | 324/37 |

*Primary Examiner*—Robert J. Corcoran
*Attorney, Agent, or Firm*—Watson, Cole, Grindle & Watson

[57] ABSTRACT

Apparatus for supporting and propelling a material to be inspected through a magnetic flaw detection device. A feeding device propels the material through the magnetic flow detection device. A plurality of the flaw detection devices are mounted at spaced intervals along the path of travel of the material. Each of these flaw detection devices includes a supporting structure, a shaft suspended vertically from the supporting structure and a base member pivotally mounted at an end of the shaft at a position adjacent to the material. At opposite ends of each of the pivoted base members, a rotatable turret is resiliently mounted. Each of the rotatable turrets includes a mechanism for indexing the turret about the vertical axis and a pair of spaced rollers which are arranged for contacting the material so as to guide the material along its path of travel. The angle of the rotatable turrets with respect to the longitudinal axis along which the material moves thus determines the amount of spiral rotation of the material. A magnetic detection unit is mounted between the ends of the pivoted base member and extends adjacent to the surface of the material.

4 Claims, 16 Drawing Figures

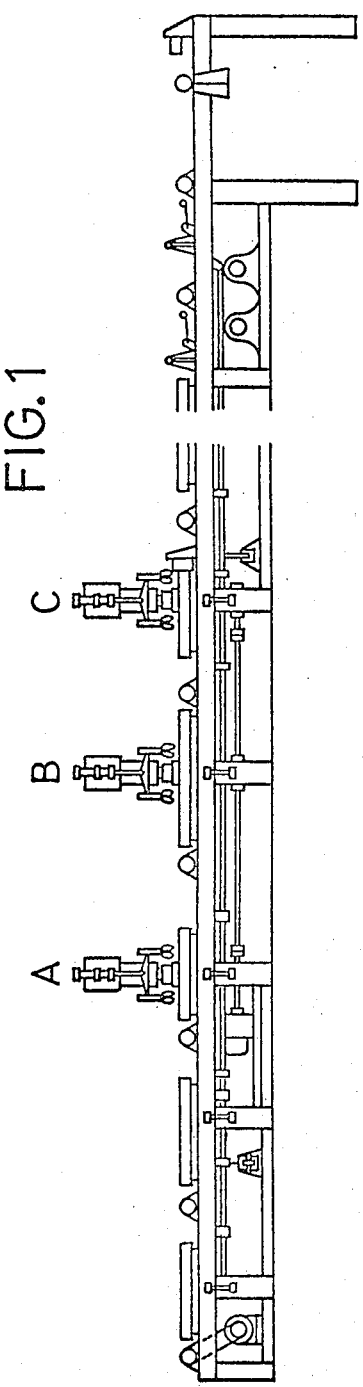
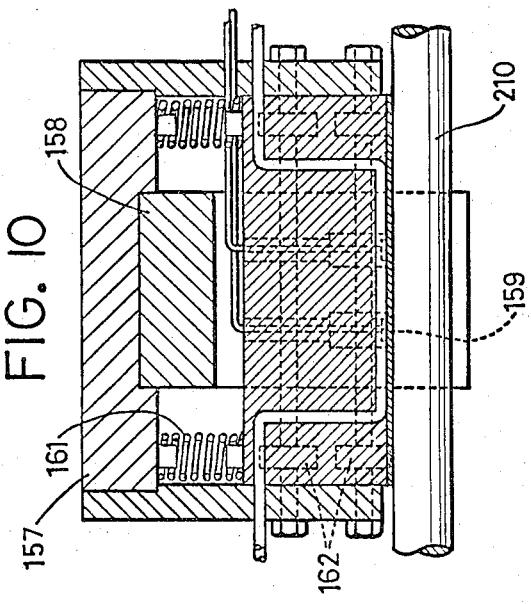
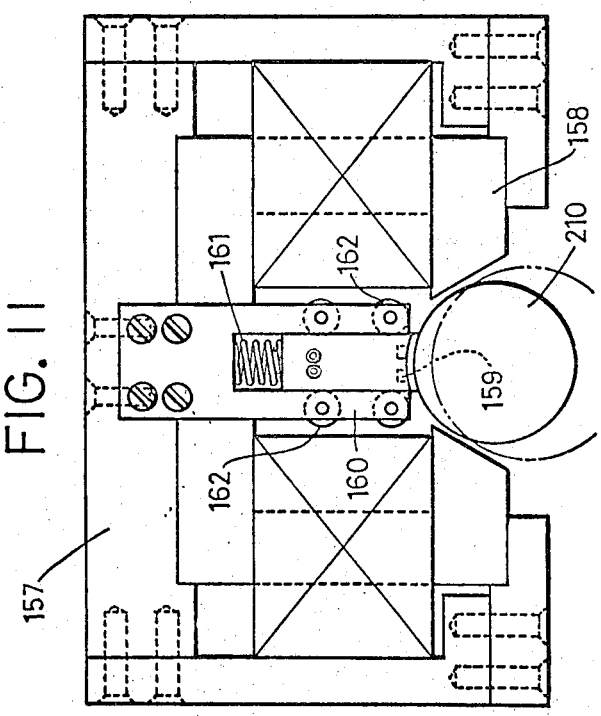

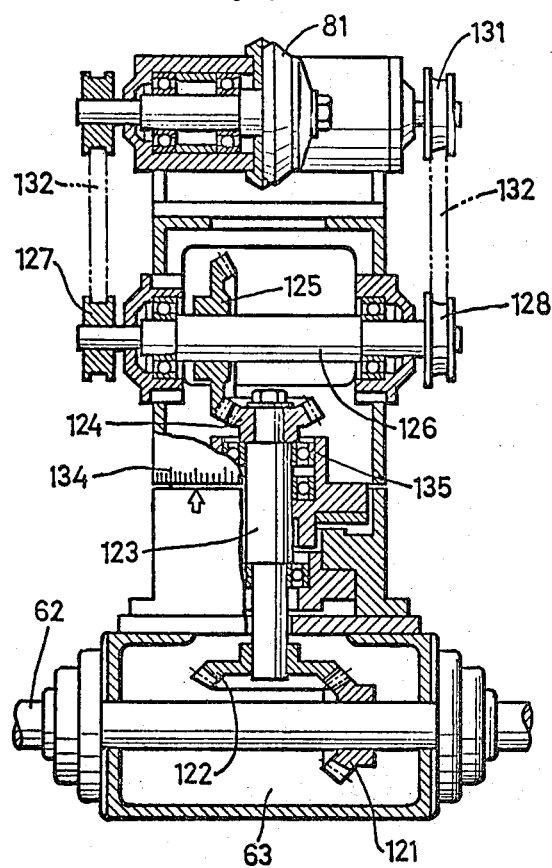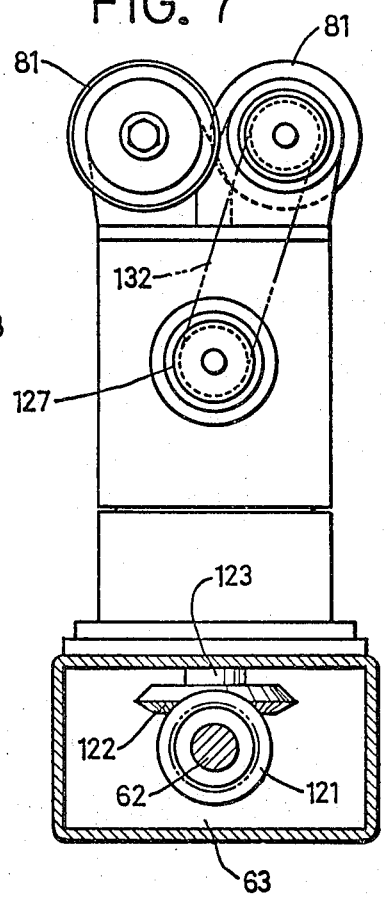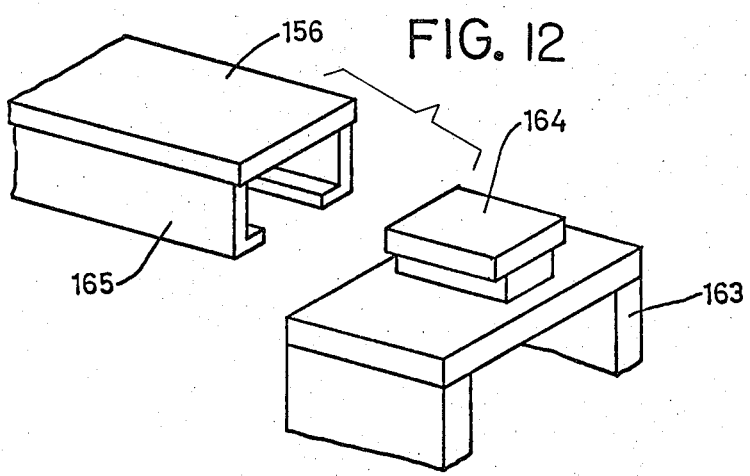

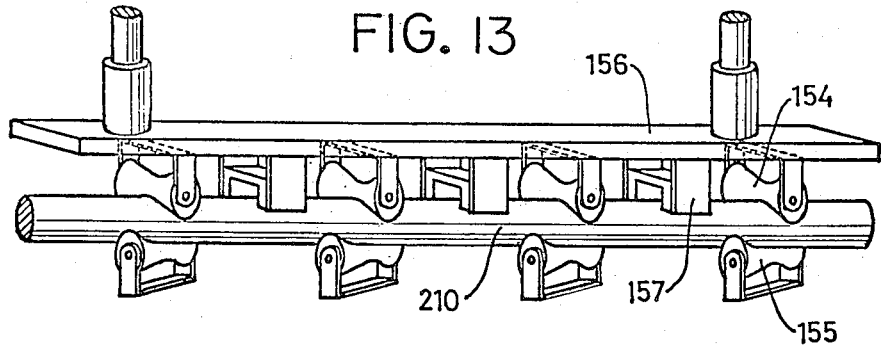
FIG. 13
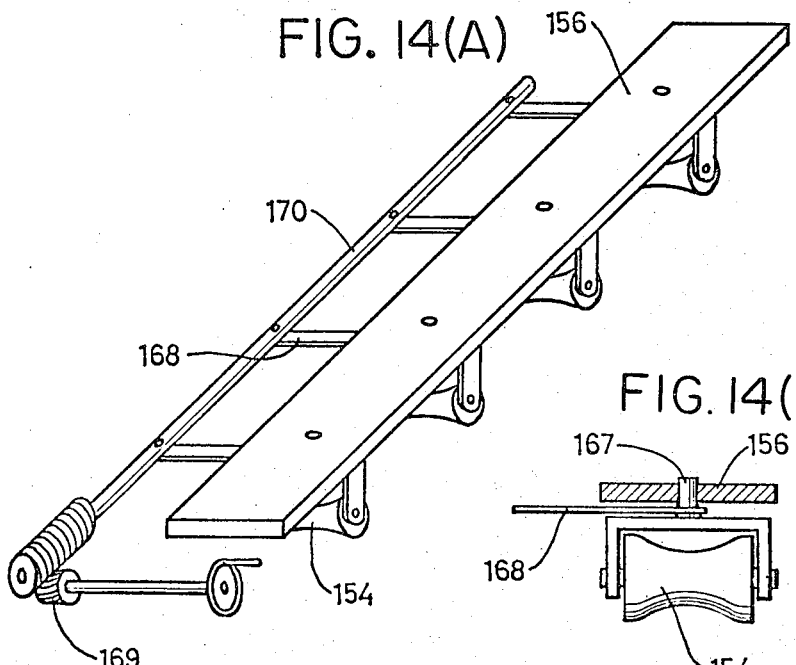
FIG. 14(A)
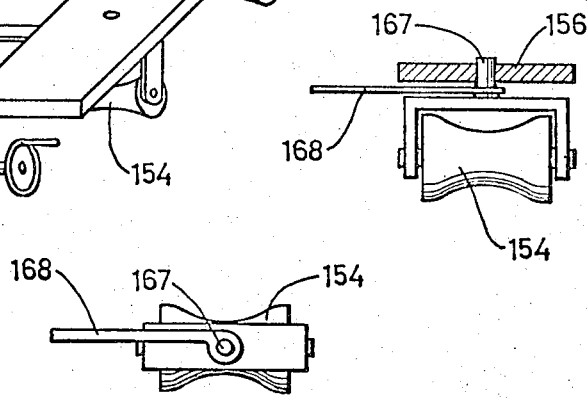
FIG. 14(B)
FIG. 14(C)

APPARATUS FOR SUPPORTING AND PROPELLING MATERIAL THROUGH MAGNETIC FLAW DETECTION DEVICES

This is a continuation of application Ser. No. 185,688, filed Oct. 1st, 1971, now abandoned, as a division of application Ser. No. 21,062, filed Mar. 19th, 1970, now U.S. Pat. No. 3,670,239.

This invention relates to magnetic flaw inspecting apparatus using magneto-sensitive diodes as means of detecting flaws in such magnetic materials as round steel bars and pipes.

A magnetic flaw detecting method is a kind of non-destructive inspection method for detecting any discontinuous part present in a magnetic body. Its principle is to detect a magnetic leakage flux from the discontinuous part such as the flaw by various methods when a magnetic body is magnetized.

The amount of the magnetic leakage flux caused by the flaw varies with the depth, width, shape, etc. of the flaw. It has been confirmed, however, that when the flaws are of substantially the same width, shape, etc., the amount of the magnetic leakage flux is proportional to the depth of the flaw. From this result it is possible to learn the depth of the flaw by measuring the amount of the magnetic leakage flux and the automatic magnetic detection can be quantatively realized.

A magnetic particle inspection method which has been employed widely comprises the steps of attracting the magnetic particles to the flaw by the above mentioned magnetic leakage flux and effecting a visible observation of the formation of a magnetic particle pattern, thereby locating the flaw. However, such a magnetic particle inspection method has the disadvantage that a quantative measurement and objecting inspection of the flaw can not be made, and besides its inspection rate is slow so that an On-Line inspection corresponding to the rolling velocity of the stock material is impossible.

Furthermore, an inspection method recording the magnetic leakage flux onto a magnetic recording tape, in which the flaw detection must be carried out by closely fitting the tape to the surface of the material to be inspected, has the disadvantage that it is not suitable for inspecting materials having a rough surface such as hot-rolled (billet) material. Moreover, according to a searching coil inspection method wherein the flaw is detected by a voltage generated in a coil by the amount of the magnetic leakage flux linking with the coil it is difficult to set the coil in response to the leaking state of the magnetic leakage flux, as described later, so that the flaw detecting sensitivity remains low.

In a method of detecting the magnetic leakage flux wherein a Hall generator is adopted, such as disclosed in British Pat. No. 1,169,752 by the present applicant, an automatic magnetic flaw inspecting method can be carried out, but the magnetic sensitivity of the Hall generator is low.

In the flaw detecting method and apparatus using magneto-sensitive diodes as in the present invention, the magnetic flaw detector is made by utilizing the fact that the variation of the self resistance value by the direction and size of the magnetic field can be easily detected. The magneto-sensitive diode is so small that it is capable of detecting the magnetic leakage flux generated from a very small flaw.

In case of the Hall generator the magnetic leakage flux generated from a very small flaw was difficult to be detected. The magneto-sensitive detector is so small that it is able to detect fine flaws or a small magnetic leakage flux. There is a great advantage that an output voltage several hundred times as high as a the Hall generator is obtained. The signal to noise ratio is very high.

In view of the defects of the above described conventional methods, the present invention provides a novel non-destructive inspection technique by rising the various excellent characteristics of magneto-sensitive diodes wherein flaws are detected from the magnetic leakage flux in a magnetized material having a circular cross-section as it is propelled in the axial direction while being rotated. Sets of two magneto-sensitive diodes are mounted adjacent to the material to be inspected about a magnetic center axis and are differentially amplified so that noises detected by the respective magneto-sensitive diodes may be canceled in common. Both poles of a high frequency exciting electromagnet are mounted adjacent to the material to be magnetically inspected. The diodes are separated by a distance equal to the distance between the peaks of the magnetic leakage flux. A plurality of sets of automatic balancer circuits equal in numbers to the diode senses for automatically minimizing a detecting signal caused by magnetic flux leaking between the magnetic poles are also provided. A single unifying circuit is provided to select only the maximum detected value so that sorting, marking, counting and recording may be made from the output signal of the unifying circuit.

The present invention also provides a detecting head having many detectors and an apparatus wherein the flaws are automatically detected by selecting one output the plurality of detecting outputs.

The present invention provides a non-destructive inspection apparatus by using multiple detectors and associated amplifying circuits and demodulating circuits as well as a single for selecting one of circuit unifying the detected outputs from the respective circuits and respective output circuits automatically sorting, evaluating and handling the outputs of the unifying circuit.

The present invention further provides an apparatus for detecting flaws in such materials as round steel bars and pipes by using many detecting units.

With the flaw inspecting method and apparatus of the present invention, even a material to be inspected having some camber can be inspected to detect any substantial flaw without requiring the camber to be straightened. When the multiple detecting units of the present invention are connected, the inspecting speed becomes several times higher than before and a remarkable increase of the inspecting efficiency can be expected.

The flaw detector to be fitted to a detecting unit according to the present invention can be applied to all non-destructive inspections. For example, there are provided an ultrasonic flaw detecting apparatus wherein flaws are detected by water jet coupling or in a liquid, a magnetic flaw inspecting apparatus wherein a Hall generator or a magnetic resistance element varying its electric resistance with the variation of a magnetic field is mounted in the magnetic field and an eddy current flaw inspecting apparatus wherein a detecting probe is combined with an exciting coil. Further, a universal flaw inspecting method and apparatus are provided in which the distance between the feeding roll and supporting roll and their pitch angles are adjusted so that the straight advance and the spiral rotary propelling of a cylindrical material to be inspected may be feely selected and which has side uses for not only the detection of flaws on the entire surfaces of materials but also the detection of the camber of welded pipes at a high efficiency and high inspecting speed.

Therefore, a first object of the present invention is to provide a flaw inspecting method and apparatus having a detecting sensitivity higher than that of a search coil or Hall-generator by using magneto-sensitive diodes.

A second object of the present invention is to provide a flaw inspecting method and apparatus wherein an automatic detection can be made by selecting detected outputs from many detectors.

A third object of the present invention is to provide a method and apparatus wherein a flaw detector is borne rotatably in the advancing direction and transverse direction of a material to be inspected, multiple detecting units are mounted adjacent to the above mentioned material and connected at any desired intervals and a device for feeding the above mentioned material is movable with respect to the detecting unit so that the above mentioned material may be inspected to detect flaws.

A fourth object of the present invention is to provide a inspecting method and apparatus wherein flaws in small diameter round bars and pipes can be very simply detected.

FIG. 1 is an elevational view of the entire apparatus according to the present invention using a plurality of detecting units;

FIG. 6 is a partly vertically sectional side view of a mechanism for feeding materials to be inspected;

FIG. 7 is an elevational view of FIG. 6;

FIG. 10 is a vertically sectional side view of a detecting head to be used to inspect small diameter materials in the apparatus according to the present invention;

FIG. 11 is an elevational view of FIG. 10;

FIG. 12 is a perspective view showing a detecting head fitting mechanism;

FIG. 13 is a perspective view showing an embodiment of the apparatus shown in FIG. 10;

FIG. 14(A) is a perspective view showing an embodiment of a roll angle changing mechanism;

FIG. 14B is a partly vertically sectional view of FIG. 14A;

FIG. 14C is a plan view of FIG. 14B. The detection system of the present invention preferably utilizes a magneto-sensitive diode detection device such as illustrated and described in previously mentioned U.S. Pat. No. 3,670,239.

FIG. 1 is a general view of an apparatus embodying the method of the present invention. In the illustrated apparatus, three detecting units A, B and C are provided as connected at equal intervals and a long material to be inspected (not illustrated) is fed into the unit C from the unit A so as to be divisionally inspected for flaw detection at a high efficiency. The detecting unit interval may be properly selected depending on the length of the normally used material to be inspected so as to be, for example, 4m. if the length of the material to be inspected is 12 m. in case 3 units are to be used or 3 m. in case 4 units are to be used. It is better to provide the respective detecting units so that they are movable to and fro. Now, in the case of inspecting the entire surface to detect, by spirally propelling a material to be inspected of a total length of 12 m. at a pitch of 30 mm. (which is an effective flaw detecting width of the flaw detector), if the rotating speed of the material to be inspected is 100 r.p.m., with one flaw detecting unit, it takes 4 minutes for the entire surface flaw detection but, if 3 detecting units are used, the allotted length for one unit is only 4 m. and the time required to complete the entire surface flaw detection is 1 minute and 20 seconds.

The mechanisms of the respective parts of the present apparatus shall be detailed with reference to the drawings.

Figure 2:
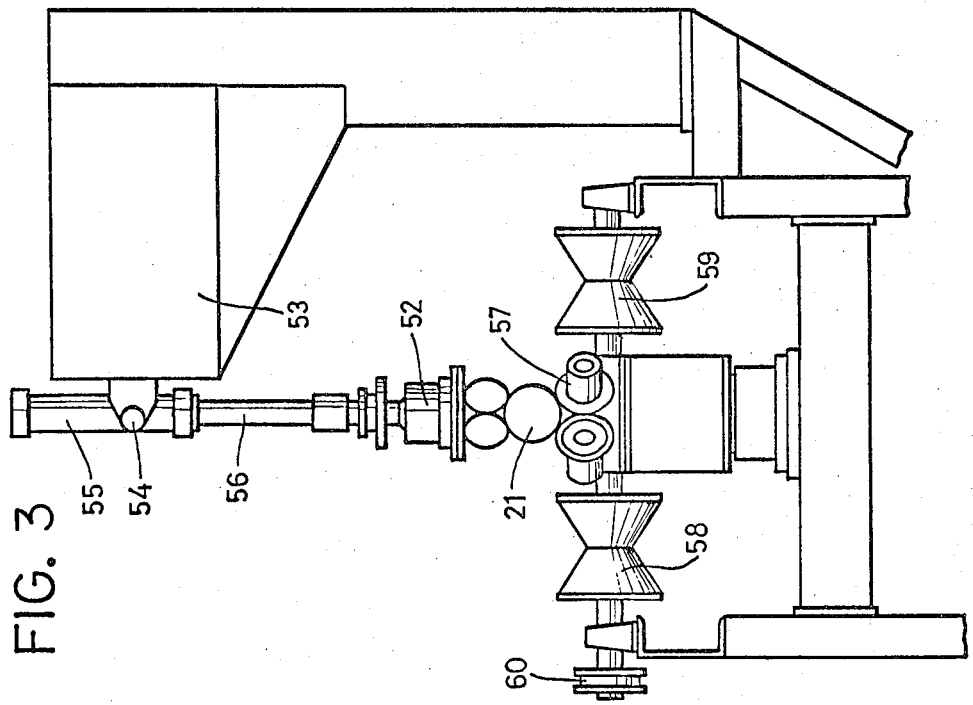
FIG. 2 is a side view of a single detecting units.
Figure 3:
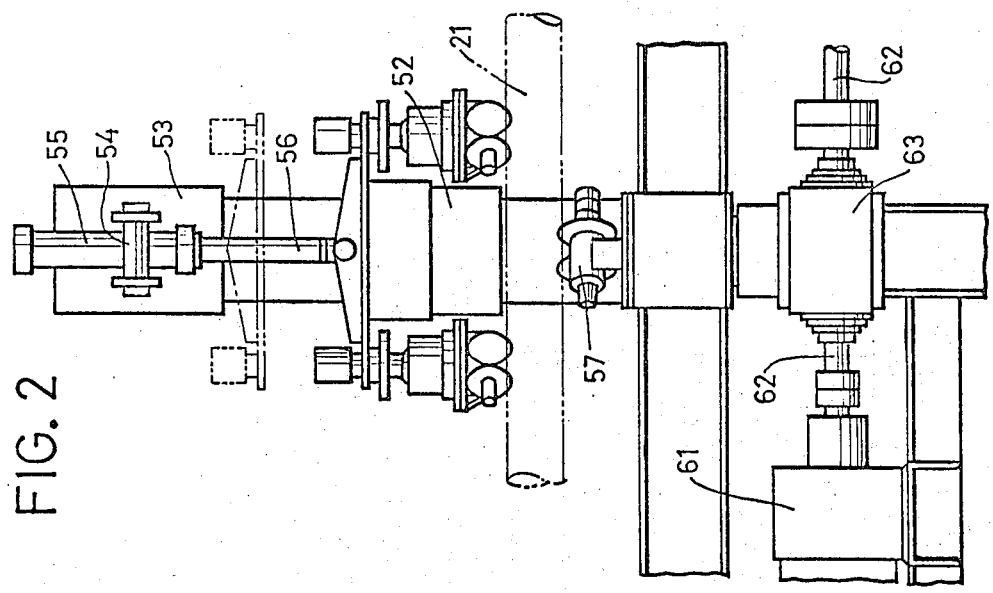
FIG. 3 is an elevational view of FIG. 2.

FIGS. 2 and 3 show a detecting unit (for example, A in FIG. 1) of a main part of the present invention of a flaw detecting apparatus having conveyer devices before and after it as a round or cylindrical material 21 is being inspected to detect flaws. A flaw detecting head 52 is hung and supported on a rod 56 of a cylinder 55 rotatably mounted on a column 53. On the other hand, the round or cylindrical material 21 to be inspected is fed spirally or longitudinally with a pipe feeding device located just below it in the mechanism.

That is to say, the cylindrical material to be inspected is made movable in the direction at righ angles with the feeding direction of the material so that the flaw detector may follow rocking movements accompanying camber in detecting flaws. In the drawings, two series of V-shaped roll conveyers 58 and 59 are used as inlet and outlet conveyers for the material to be inspected and are driven with a wheel 60 but may be also used for rack-sorting the material into a good article or faulty article with the quality grade after the flaw detection. The feeding device 57 is part of a mechanism for effecting a rotational or longitudinal advance feed to the material to be inspected as described later by means of a rotary shaft 62 driven by an electric motor 61 provided with a cyclo or ring cone speed reduction gear and a gear box 63.

The details of the mechanism of the detecting unit shall be explained with reference to FIGS. 4 and 5. A cylinder 55 is fitted to a column 53 with a pin 54 rotatably in the direction horizontal to the advancing direction of the material to be inspected (strictly speaking, on an arc around the pin 54 as a center). A hanging base 72 is mounted on bar 56 by means of a hinge pin 71 between its ends so as to be movable up and down with bar 56. A hanger 73 is mounted below the hanging base at its center portion for the purpose of suspending a flaw detector 74.

As described in the above noted patent a flaw detector adapted to a supersonic, magnetic or eddy current flaw inspecting method is selected for use. Depending on the use and object, a flaw detector of not only one element but also many elements is provided. In the drawings, 75 is a connecting joint for a lead wire exciting current source, cooling water or cooling air pipe to be used depending on the object. The hanging base 72 is provided with a set of two supporting rollers 81, a rotating pitch adjusting device 82 for said rollers and a vertical position adjusting device 83 for the rollers each located at opposite ends of the flaw detector. The two rollers 81 of the set which make the later described feeding roller spacing adjustable, are idler rollers and are rotatably mounted on vertical plates 92 fixed to a disk 91. Disk 91 is formed integrally with a base plate 93 and an inner cylinder 94 and is freely rotatable within an outer cylinder 96 by means of a bearing 95 which transmits all the pressing force of cylinder 55 to cylindrical material 21.

The degree of the above mentioned rotation, that is, the feed pitch angle of the supporting roller may be accurately adjusted by means of a dial 99 located on disk 91 and capable of being viewed through a window 98 provided in upper plate 97. This plate is fixed in its adjusted position by utilizing a hole 100 located therein.

A cylinder 101 is fixedly mounted in each end edge part of the hanging base 72. A shaft 102 is mounted on a rigid spring 103 for sliding movement within each cylinder 101, and each supports a rotation adjusting device 82 provided for the pair of support rollers 81. Shaft 102 is mounted in place at its upper end by means of a bolt 105 or the like at the top part of a slidable crown 104 which contacts the outer surface of cylinder 101. A rotary handle 106 is threaded in place on each shaft 102 and rests on its base part 107.

Therefore, by rotating handle 106, the vertical position of the supporting roller 81 can be finely adjusted. Any large impact force as caused by a larger camber or the like of the material to be inspected and which is sensed by rollers 81 is absorbed by spring 103. Also, a plurality of small holes 108 are located at the periphery of each rotary handle 106, and a pin 111 is extended through the hole coinciding with a hole 109 in hanging base 72 to avoid slippage during operation in the adjustment of the vertical position of each device 82.

The detecting units of the above mentioned structure are connected at desired intervals as in A, B and C in FIG. 1.

A feeding device, of the type shown in FIGS. 6 and 7 for the material to be inspected is provided for each detecting unit.

Each feeding device is driven by means of a rotary shaft 62 connected to an electric motor 61 which is provided with the speed reduction gear and bevel gear box 63. That is to say, the rotation is transmitted to an upright shaft 123 through a bevel gear 121 of rotary shaft 62 and a bevel gear 122 meshing with it. A horizontal shaft 126 is rotated with a bevel gear 125 meshing with a bevel gear 124 of said shaft, and the driving force is transmitted by wheels 127 and 128, fixed at both ends of shaft 126, connecting with driving wheels 131 for the feeding rollers 81 through chains or belts 132. This driving device is such that the rotary feeding pitch of the material to be inspected may be freely adjusted and varied. Graduation 134 is the same as that of dial 99 in FIG. 5 for the supporting roller, so that a similar adjustment of the feeding device may be made as it rotates about a vertical axis by means of bearings 135.

If a plurality of detecting units and inspected material feeding devices of the above mentioned types are provided as connected in detecting flaws and are applied to substantially any flaw inspecting method, a remarkable improvement of the inspecting efficiency can be attained. However, when continuously inspecting material of more than 10m. long to detect flaws, a following mechanism of only the detecting unit is insufficient and particularly, in the intermediate detecting unit part, due to rocks caused by camber of the material to be inspected, it is difficult for the flaw detector to follow the material and noises are caused. In such a case, it is desirable that the material to be inspected is fed by only the first detecting unit and final detecting unit and the intermediate detecting unit has no feeding drive and is made a bearing part following the rocking of the material to be inspected.

Figure 8:
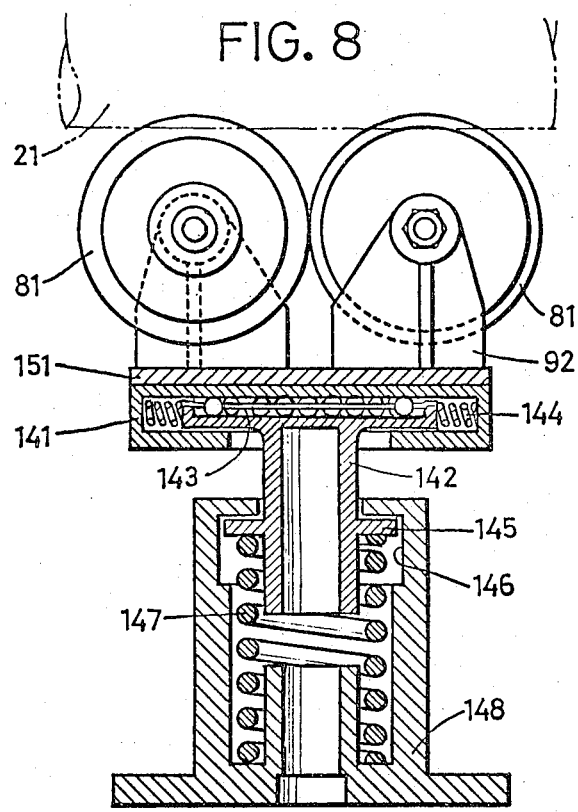
FIG. 8 is a partly vertically sectional side view of an intermediate supporting mechanism for materials to be inspected, showing a cross-section on line XXVI-XXVI in FIG. 9.

Such an arrangement is shown in FIG. 8 as including a base 141 supporting a pair of rollers 81 rotatably mounted on vertical plates 92 the base having a rectangular cross-section opened at the bottom (⊏⊐) An inner fitted cylinder 142 of a T-shaped cross-section extends into supporting base 141 so as to be movable in the horizontal direction. Ball bearings 143 are appropriately arranged on the upper part of the T-shaped inner fitted cylinder 142, and a spring 144 is located in a gap portion at each end of the upper part so that supporting base 141 and inner fitted cylinder 142 may be horizontally movable. A flange 145 is provided at the lower portion of the T-shaped inner fitted cylinder and is moved outwardly a base cylinder 148 with a recess 146 fitting said flange by means of a spring 147. A recess 146 in the base cylinder is provided for accommodating movement of flange 145. When this structure is set just below the above described intermediate detecting unit, it freely follows any rocking of the material 21 to be inspected in both horizontal and vertical directions, and the flaw detector can accurately move relative to the inspected material due to the upward spring force from the supporting roller by spring 147 and the pressing force from above by cylinder 55 of the detecting unit.

FIG. 8 shows only an example of a rocking following roller of the simplest structure. In addition to spring 147, an oil pressure cylinder or oil pressure buffer mechanism for urging cylinder 142 vertically upwardly.

Figure 9:
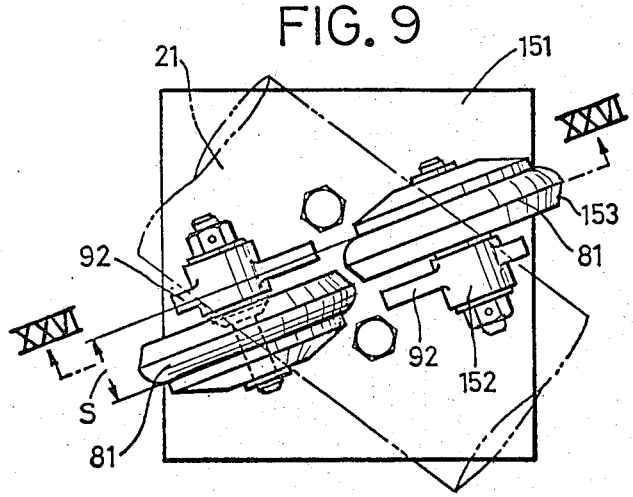
FIG. 9 is a plan view of FIG. 8, showing the relationship between the roller and the material to be inspected.

Lastly the feeding and supporting rollers for inspected materials to be used in the present invention are shown in FIG. 9. The supporting rollers of FIG. 8 are shown in plan view in this Figure. However, a form common to all the rollers is preferable. That is to say, roller 81 is mounted on base plate 151 by means of plate 92 and bearing 152, and is so oriented that its annular support surface 153 flatly contacts the material to be inspected so as to effect a positive feeding friction. By adjusting the relative positions of both rolls and the feeding pitch (the roll angle with the material to be inspected), the material to be inspected of any outside diameter can be propelled with any spiral pitch. By making the relative distance S between both rolls large and making the roller pitch zero (that is, making the roller and the material to be inspected parallel with each other), the material to be inspected can be propelled longitudinally.

FIGS 10 and 11 show a follower mechanism for maintaining a constant spacing between the detector of the apparatus of the present invention and the surface of the material to be inspected. A holder 160 provided therein with an element 159 is interposed between both legs of a magnet 158 mounted on a magnet frame 157 to freely follow the vertical rocking movement by means of a spring 161. The holder 160 is guided by two opposed rollers 162 so that it can follow only the vertical rocking movement of the detector.

Figure 4:
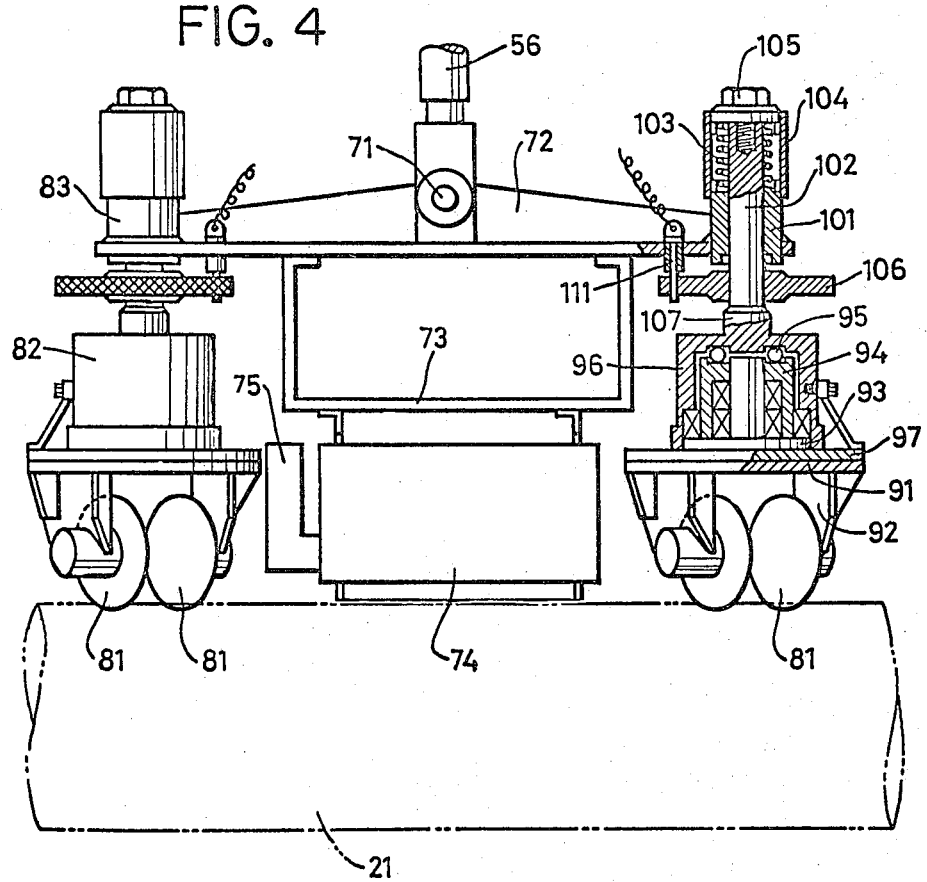
FIG. 4 is a side view showing a detecting unit as magnified.
Figure 5:
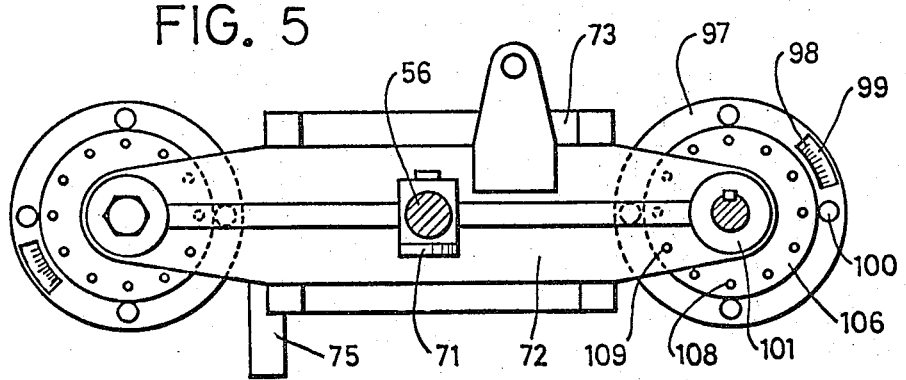
FIG. 5 is a plan view of FIG. 4.

It should be noted that this detector following mechanism is assembled in the flaw detector 74 shown in FIG. 4.

In application of the apparatus of the present invention to the round bars or pipes having a small diameter, as shown in FIGS. 12 to 14, only the detector following mechanism may be used, so that the flaws can be detected by a simpler mechanism. A material 210 to be inspected is disposed between two opposed sets of upper and lower roller 154 and 155 which are respectively oriented as having the appropriate angle between them so that the material 156 to be inspected may be spirally moved while being rotated. Rollers 154 are each rotatably mounted on frame 156 to which is fixed a magnet frame 157 so as to spirally scan the surface of the material 156 to be inspected. One frame has three or more detecting heads which can be simultaneously moved up and down.

The magnet holder 163 (FIG. 12) is provided with a projection 164 which can be inserted into an engaging part 165 in frame 156 so that the detecting head may be easily replaced according to the dimensions of the material. As the scanning pitch of detector 159 is determined by the rotary feed of the material to be inspected, when the diameter of the material to be inspected varies, the angle of the rollers must be varied so that the scanning pitch may be constant.

In order that the angle of the roller pair in one flaw detecting part may be simultaneously varied to save time required to vary the roller angle of so many rollers, a short rod 168 is pivotally mounted on shaft 167 of each roller and on a rod 170 so that, by moving rod 170 by means of a proper driving mechanism 169, the respective short rods 168 may be simultaneously moved forward or rearward to simultaneously rotate all the rollers. Thus, materials of small diameters can be automatically inspected to detect flaws.

What is claimed is:

1. Apparatus for supporting and propelling a material to be inspected through a magnetic flaw detection device, comprising:

a feeding device for propelling said material;

a plurality of flaw detection devices mounted at spaced intervals along the path of travel of said material;

each of said flaw detection devices including a support structure, a shaft suspended vertically from said support structure, and a base member pivotally mounted at an end of said shaft adjacent said material, opposite ends of said pivoted base member including a rotatable turret resiliently mounted thereto, each of said rotatable turrets including means for indexing said turret about the vertical axis thereof and a pair of spaced rollers contacting said material for guiding said material along its path of travel, whereby the angle of said rotatable turret with respect to the longitudinal axis along which said material moves determines the amount of spiral rotation of said material;

and a magnetic detection unit mounted between the ends of said pivoted base member and extending adjacent the surface of said material, said magnetic detection unit includes a magnetic yoke assembly coupled to said base member and including a spaced pair of magnetic poles mounted to extend on either side of said material and said base member includes means for resiliently mounting said magnetic detection unit and including guide rollers engaging guide channels for vertically guiding said magnetic detection unit.

2. Apparatus as in claim 1 wherein each of said rotatable turrets includes means for locking said turret in any one of a number of angular positions about the vertical axis thereof, and said pair of rollers are symmetrically located with respect to a plane extending parallel to the rotational plane of said rollers.

3. Apparatus as in claim 1 wherein a pair of spaced rollers is mounted to each said rotatable turret and are freely rotatable about the vertical axis thereof.

4. Apparatus as in claim 1 further comprising a drive mechanism driven by said feeding device, said drive mechanism including a first bevel gear assembly connected to said feeding device and a vertically extending drive shaft connected to said first bevel gear assembly, a second bevel gear assembly including a horizontally extending drive shaft driven by said vertically extending drive shaft, a pair of spaced drive rollers, a shaft interconnecting said pair of spaced drive rollers and being connected to said horizontally extending shaft.

* * * * *